Feb. 10, 1925.
A. G. HOOVENS
1,526,148
MACHINE FOR MANUFACTURING WIRE CABLE
Filed June 8, 1923 5 Sheets-Sheet 2
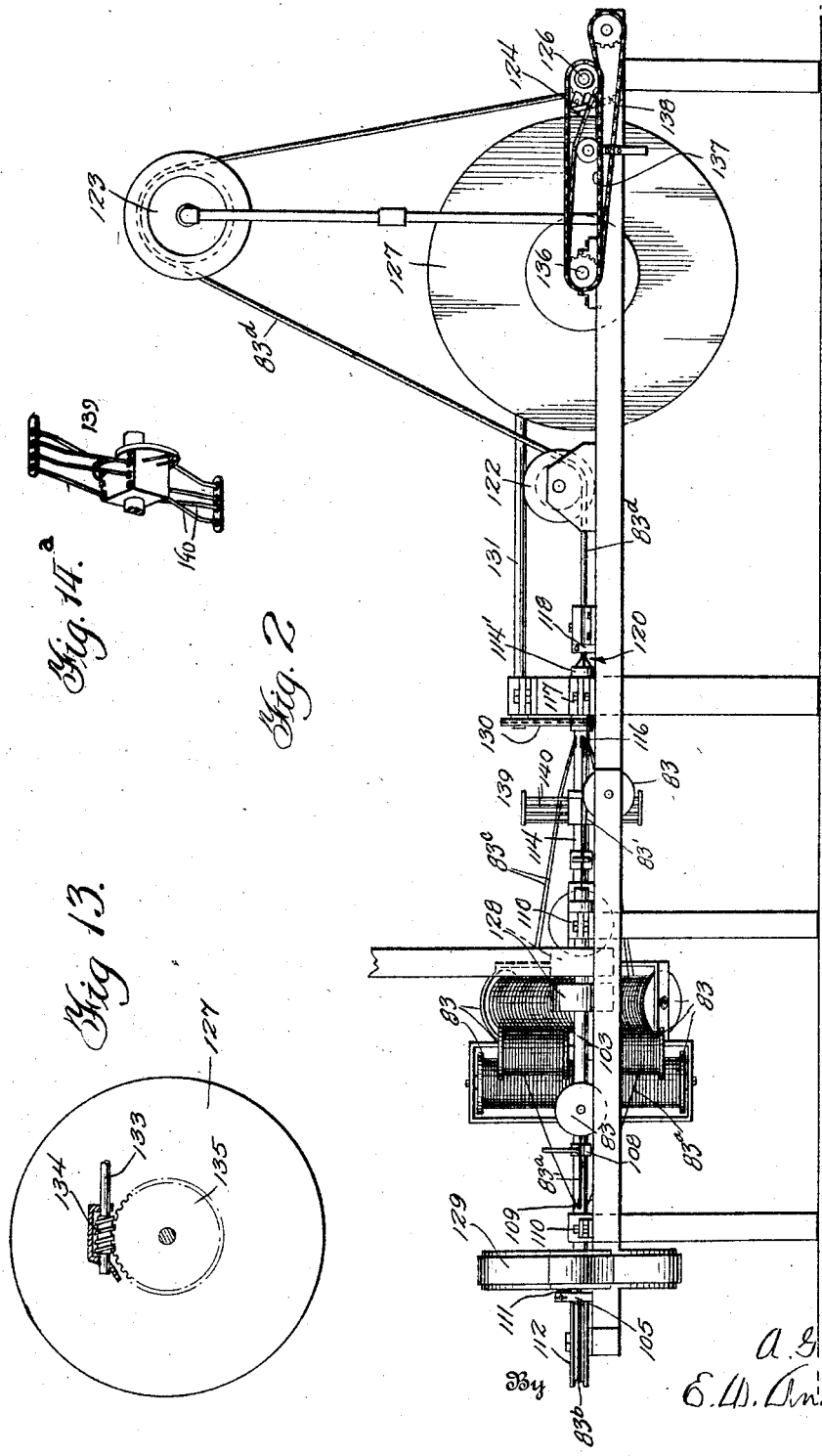
Inventor
A. G. Hoovens.
By E. W. Anderson Son
Attorneys

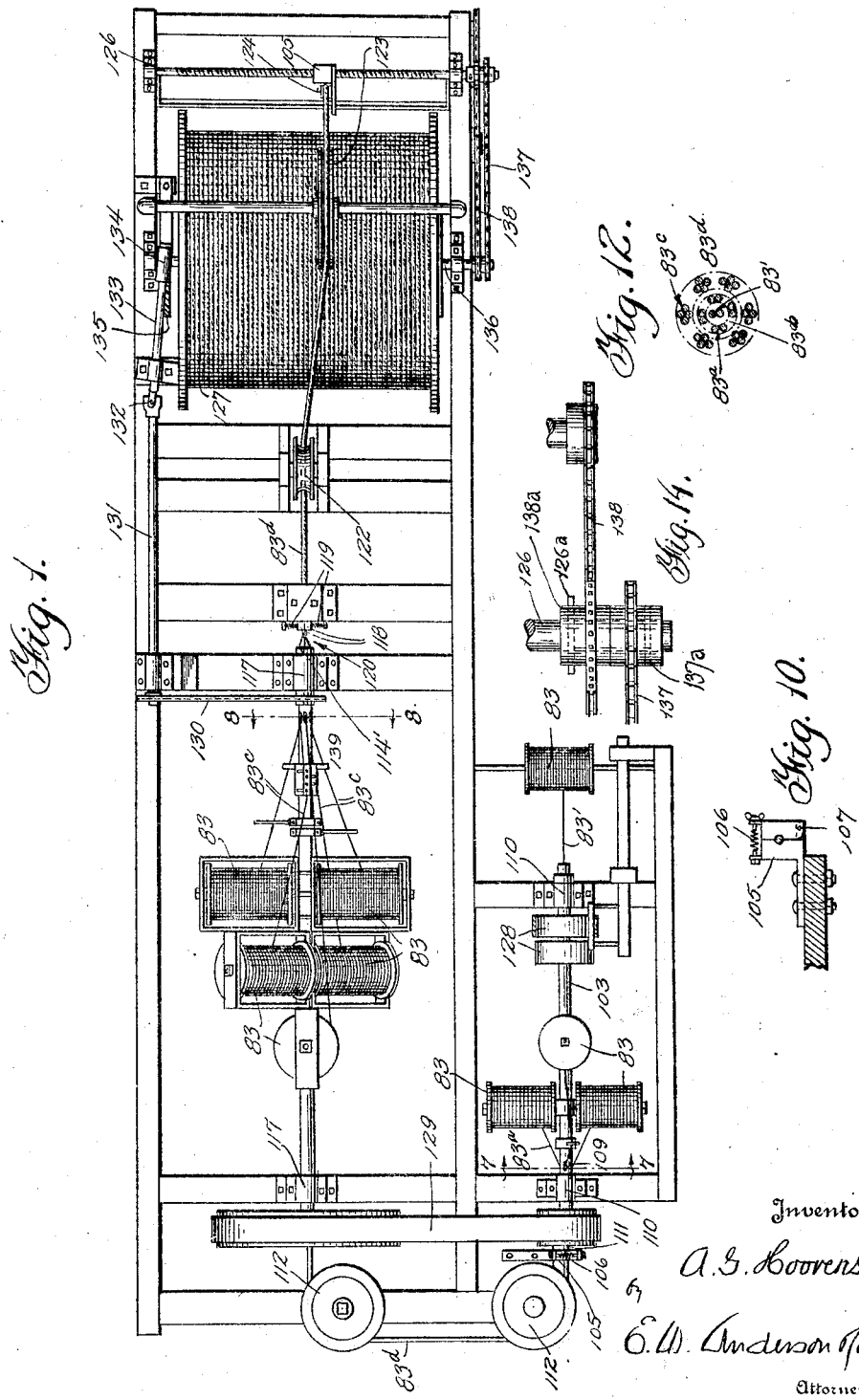

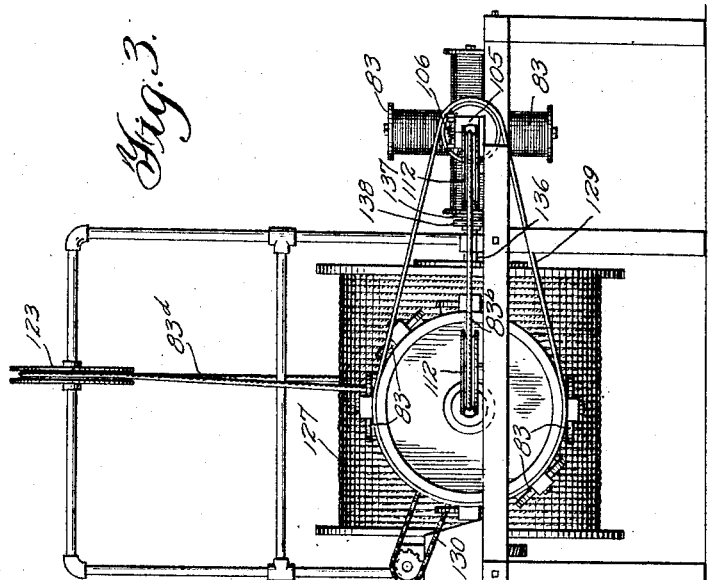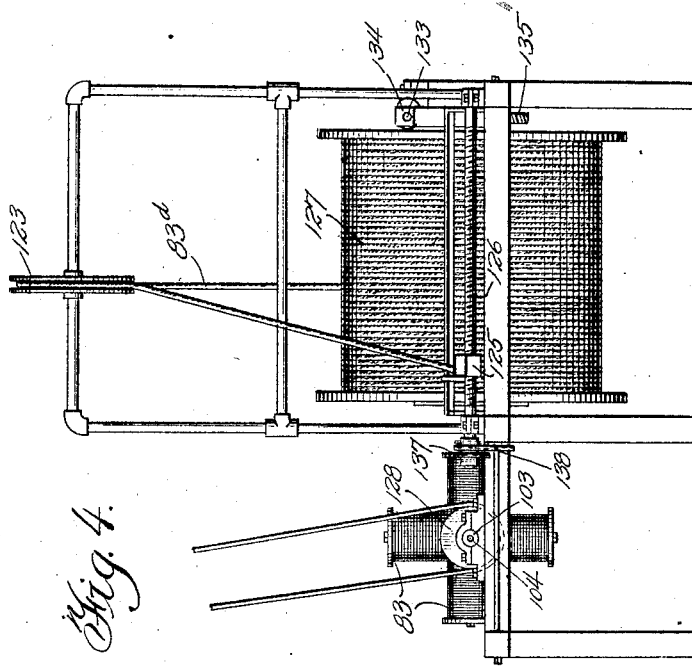

Feb. 10, 1925.
A. G. HOOVENS
1,526,148
MACHINE FOR MANUFACTURING WIRE CABLE
Filed June 8, 1923   5 Sheets-Sheet 4
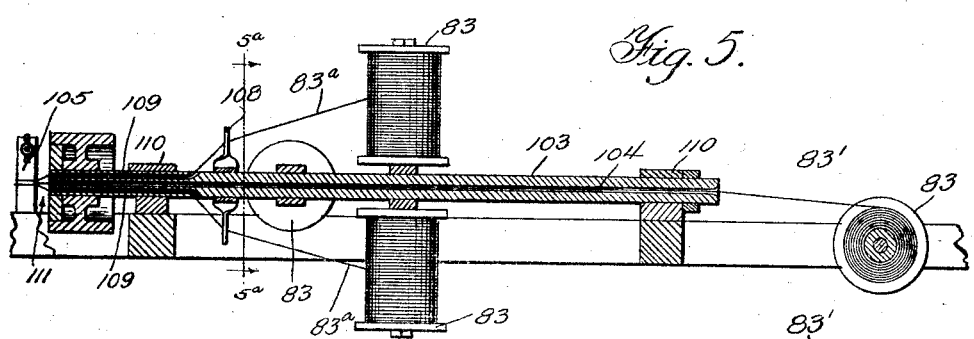
Fig. 5.
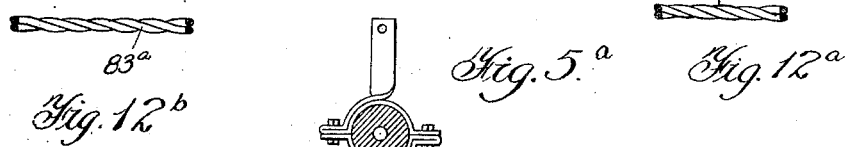
Fig. 12b   Fig. 5a   Fig. 12a
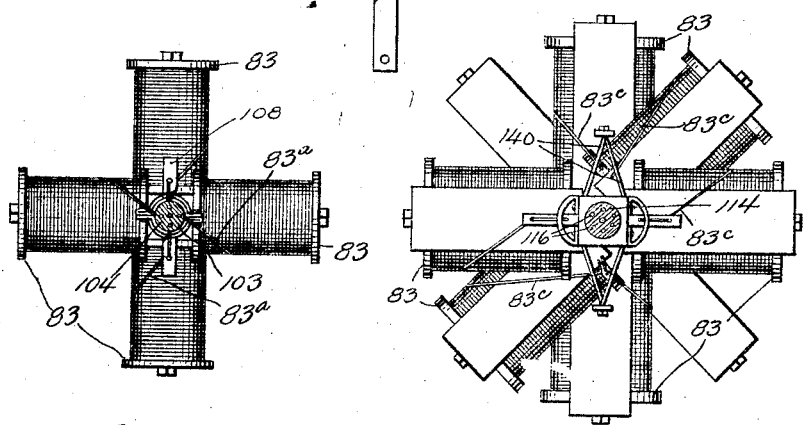
Fig. 7.   Fig. 8.
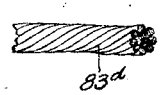 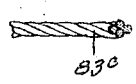
Fig. 12c   Fig. 12d
Inventor
A. G. Hoovens.
By E. W. Anderson
Attorneys

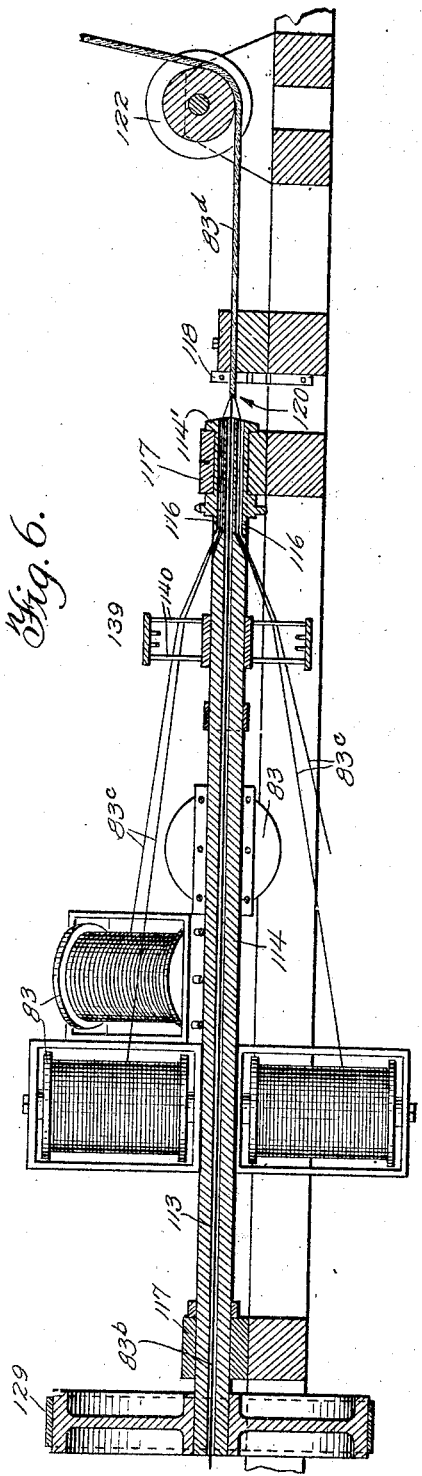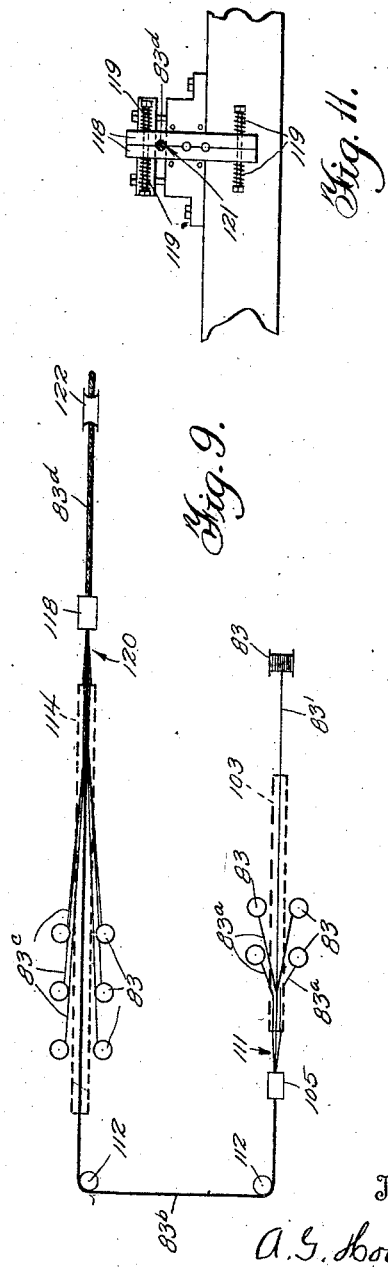

Patented Feb. 10, 1925.

1,526,148

UNITED STATES PATENT OFFICE.

AMASA G. HOOVENS, OF GOSHEN, INDIANA.

MACHINE FOR MANUFACTURING WIRE CABLE.

Application filed June 8, 1923. Serial No. 644,254.

*To all whom it may concern:*

Be it known that I, AMASA G. HOOVENS, a citizen of the United States, residing at Goshen, in the county of Elkhart and State of Indiana, have made a certain new and useful Invention in Machines for Manufacturing Wire Cable, of which the following is a specification.

The invention has relation to machines for manufacturing wire cable of that species designed for use as a lightning conductor in the protection of buildings against storm hazards, the present invention being concerned with the third and last step of said manufacture, wherein a plurality of wire strands or subsidiary ropes or cables fed from take off spools are brought together and twisted around a core strand or subsidiary rope, the latter also fed from a take off spool, to thereby form the complete cable, and the latter is wound upon a receiving drum.

The invention consists in the novel construction and combinations of parts as hereinafter set forth.

In the accompanying drawings illustrating an embodiment of the invention, the following is a brief description of the figures—

Figure 1 is a plan view of the machine.

Figure 2 is a side view of the same.

Figure 3 is an end view of the same.

Figure 4 is a similar view taken from the opposite end of machine.

Figure 5 is a central longitudinal sectional detail view of the wire twisting mechanism for the core of the complete cable.

Figure 5$^a$ is a detail section on the line 5$^a$—5$^a$, Figure 5.

Figure 6 is a similar view of the wire twisting mechanism for the complete cable including said core.

Figure 7 is a section on the line 7—7, Figure 1.

Figure 8 is a section on the line 8—8, Figure 1.

Figure 9 is a diagrammatic plan view of the machine.

Figure 10 is a detail face view of the stationary jaws of the mechanism shown in Figure 5.

Figure 11 is a similar view of the stationary jaws of the mechanism shown in Figure 6.

Figure 12 is a diagrammatic cross section of the complete cable.

Figure 12$^a$ is a detail side view of a section of the wire core.

Figure 12$^b$ is a similar view of one of the concentric wire strands or ropes.

Figure 12$^c$ is a similar view of another of the concentric subsidiary ropes.

Figure 12$^d$ is a similar view of the complete cable.

Figure 13 is a detail view of certain parts of the drive.

Figure 14 is a detail plan view of certain other drive parts.

Figure 14$^a$ is a detail perspective view of one of the wire guides.

In this drawings, the numeral 83 designates the take-off spool for the subsidiary rope or cable constituting the core of a larger rope or cable to be made, this core in the present instance being double or formed of two wires twisted together, as disclosed in my co-pending application S. No. 641636, said core passing through a central longitudinal perforation 103 of a rotary shaft 104, and thence through between stationary jaws 105, held together by yieldable spring 106, one of said jaws being pivoted at 107.

The shaft 104 has mounted fast thereon to revolve therewith a plurality of take-off spools 83, from which the wire strands or subsidiary ropes (also double in the present instance as disclosed in my said co-pending application) pass through perforations of radial guides 108 in converging fashion and thence entering passages 109 of said shaft, said passages starting circumferentially of said shaft and being first inclined towards each other or converging and then assuming parallel relation longitudinal of the shaft (see Figure 5) and opening at the end of the shaft. The shaft rotates in bearings 110.

Adjacent said end of the shaft 104 is a stationary frame including two jaws 105 aforesaid, spaced from the end of said shaft at 111, and between which all of the wire strands or subsidiary ropes pass including the core 83′ and the concentric surrounding strands or ropes 83$^a$.

The wire strands or subsidiary ropes being arranged as stated and the shaft 104 set in rotation to revolve the wire strands relative to the jaws 105, (the latter gripping the wire strands or ropes 83′, 83$^a$ and holding them against rotation) the strands 83$^a$ surrounding the core strand or rope 83′ will be twisted around said core, the twisting taking place in the interval 111, between the jaws 105 and the end of the shaft 104, and tension being now exerted upon the wire strands or ropes to continuously pull the same through between said jaws, the wires will be progressively twisted to form a still larger rope from said strands or subsidiary ropes.

The larger rope so formed and designated 83$^b$, now passes around guide pulleys 112, and thence reversely through a central longitudinal perforation 113 of a second rotary shaft 114, parallel to the shaft 104, and whereon are mounted to revolve therewith a plurality of take off spools 83, from which the wire strands or subsidiary ropes 83$^c$ pass between guides 115 in converging fashion, and thence through longitudinal passages 116 of said shaft, said passages starting circumferentially of the shaft, converging and becoming parallel and terminating and opening at the end of the shaft (see Fig. 6) which is shown as headed at 114′ and rotates in bearings 117.

Adjacent said end of the shaft 114 is a stationary frame including two opposite jaws 118, held together by springs 119, and spaced from said end of shaft 114 at 120, all of the wire strands or subsidiary ropes 83$^b$ and 83$^c$ passing between said jaws at 121, the ropes 83$^c$ being concentric of and surrounding the core 83$^b$.

The ropes 83$^b$ and 83$^c$ being arranged as stated and the shaft 114 set in rotation and tension exerted upon the strands or ropes to continuously pull the same through between said jaws 118 (the latter gripping the ropes 83$^b$ and 83$^c$ to hold them against rotation) the strands 83$^c$ will be twisted around said core 83$^b$, the twisting taking place in the interval or space 120 between said jaws and the end of said shaft, and a still larger rope being thereby formed, which enters and passes between the jaws 118 continuously.

The wires 83$^c$ may be single strands or composed of two or more strands twisted together as in my aforesaid co-pending application, being in the present instance preferably composed of four strands of wire so twisted together.

The still larger or complete cable formed as stated, passes from the jaws 118, under guide pulley 122 thence upwardly over guide pulley 123, thence downwardly around guide pulley 124 carried by block 125 having threaded engagement with screw rod 126, the cable thence passing to the receiving drum 127 whereon it is wound, the rotation of this drum, which is positively driven, as will be presently described, serving to exert the aforesaid tension upon both the core cable 83$^b$ and the complete cable 83$^d$.

The distributor screw rod 126 is threaded in a single direction, as is also the block 125 thereon, and the direction of rotation of said screw rod is automatically reversed at intervals to cause said block to travel back and forth of the drum 127 to properly distribute the cable thereon.

The drive is through main drive shaft 104, having fast and loose pulleys 128, and belted at 129 to parallel shaft 114. Sprocket gearing 130 connects shaft 114 with a shaft 131, the latter having universal joint connection 132 with a shaft 133, the latter carrying a worm 134, in mesh with worm wheel 135 upon the shaft 136 of the receiving drum 127. The shaft 136 has sprocket gearing connection 137 with the distributor screw rod 126, and a second sprocket gearing connection 138 with said screw rod, one or the other sprocket gearing 137 or 136 being adapted to rotate said threaded distributor rod in one or the other direction at intervals as the block 105 reaches the end of the distributor rod in either direction of movement of said block.

The opposite spring tensioned jaws 118, are adjustable as a whole to bring other parts thereof in position to engage the strands or ropes being twisted together, said other parts being provided with suitable opposed recesses or jaw faces adapted to engage ropes or cables of varying sizes or diameters.

Owing to the fact that the shaft 104 has a single longitudinal central aperture 103 for its entire length and at one end portion thereof a plurality of short longitudinal apertures 109 adjacent and parallel to each other and to said central aperture, it is possible to form the short apertures 109 completely within and with all walls thereof integral of said shaft 104 and to bring said short apertures 109 closer to the central longitudinal aperture or passage 103, which is of advantage in bringing the wire strands or ropes closer together in parallel prior to twisting the same together to form the larger rope or cable.

Owing to the fact that the take-off spools 83 are arranged in series one behind the other around the shaft 104 with their longitudinal axes radial of said shaft, it is made possible to bring said spools closer to each other and to the short apertures or passages 109 of said shaft, whereby the wire strands or ropes passing from said spools to said passages have shorter lengths thereof exposed, which reduces danger of entanglement or breakage, and whereby the machine is rendered more compact.

Located between the short apertures 109 of the shaft 104 and the take-off spools 83 are guides 139 having radial members 140 between which the wire strands or ropes pass, said guides being adapted to admit of radial movement of said strands or ropes as they are unwound from said spools. The distributor rod 126 is rotated in one or the other direction at intervals as stated not automatically, but by changing the location of diametric pin 126ª from the diametric slot of the hub of sprocket 137ª to the similar slot of the hub of sprocket 138ª, the slot in each case extending also through said rod 126. See Figure 14. The distributor rod 126 may obviously be automatically rotated in a different direction each time the block 105 reaches one or the other end of said rod, means for this purpose being well known in the art.

I claim:—

In a machine for manufacturing wire cable, two parallel laterally opposite rotary shafts having a belting connection and each a central longitudinal aperture and at one end a plurality of short surrounding longitudinal apertures, a take-off spool having a core strand extending through said central aperture of one of said shafts, a plurality of take-off spools fast to and revolving with each shaft and carrying strands passing through the short apertures thereof, and means cooperating therewith and including means for exerting tension upon the wire strands related to one of said shafts for twisting the same to form a core rope, the latter passing reversely through the central aperture of the other of said shafts, said tension exerting means being adapted to exert tension upon said core rope and the surrounding strands related thereto and to twist the same reversely of the twisting of the strands of the core rope to form a complete cable and including a receiving drum, means for distributing said cable including a screw threaded rod, and means for rotating said drum and said rod including a shaft having at one end a sprocket connection with the other of said rotary shafts and at its other end a worm gearing connection with the drum shaft, the latter having a sprocket drive connection with said rod.

In testimony whereof I affix my signature.

AMASA G. HOOVENS.